(12) United States Patent
Park et al.

(10) Patent No.: US 12,122,230 B2
(45) Date of Patent: *Oct. 22, 2024

(54) UNIVERSAL WHEEL DRIVING SYSTEM

(71) Applicants: Hyundai Motor Company, Seoul (KR); Kia Corporation, Seoul (KR)

(72) Inventors: Jong Sool Park, Whasung-Si (KR); Hyung Joon Lee, Whasung-Si (KR); Jong Chan Park, Whasung-Si (KR); Jin Hyung Kong, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 76 days.

This patent is subject to a terminal disclaimer.

(21) Appl. No.: 17/890,621

(22) Filed: Aug. 18, 2022

(65) Prior Publication Data

US 2023/0311646 A1 Oct. 5, 2023

(30) Foreign Application Priority Data

Mar. 29, 2022 (KR) .................. 10-2022-0038690

(51) Int. Cl.
*F16H 37/12* (2006.01)
*B60G 21/055* (2006.01)
(Continued)

(52) U.S. Cl.
CPC ........ *B60K 17/046* (2013.01); *B60G 21/0555* (2013.01); *F16H 1/006* (2013.01);
(Continued)

(58) Field of Classification Search
CPC ... B60K 17/046; B60K 170/043; F16H 1/006; F16H 1/2836; F16H 1/2818;
(Continued)

(56) References Cited

U.S. PATENT DOCUMENTS

| 2,144,964 | A | * | 1/1939 | De Falco | F16H 1/006 74/411 |
|---|---|---|---|---|---|
| 3,315,547 | A | | 4/1967 | Fritsch | |

(Continued)

FOREIGN PATENT DOCUMENTS

| JP | 2001-315534 | 11/2001 |
|---|---|---|
| JP | 2017-159906 | 9/2017 |
| KR | 10-2014-0062538 | 5/2014 |

OTHER PUBLICATIONS

Allowed claims for U.S. Appl. No. 17/694,133 from Amendment filed on Nov. 27, 2023 (Year: 2023).*

*Primary Examiner* — Roger L Pang
(74) *Attorney, Agent, or Firm* — MORGAN, LEWIS & BOCKIUS LLP

(57) ABSTRACT

A universal wheel driving system includes a sun gear provided to receive power from a power source, a ring gear provided so that a rotation axis thereof is moved relative to a rotation axis of the sun gear and a wheel is concentrically connected to the ring gear, at least one gear train engaged to the sun gear and the ring gear and configured to allow relative motion between the rotation axes of the sun gear and the ring gear and to form a continuous power transmission state therebetween, a carrier constantly supporting a position of a rotation axis of a final pinion of the at least one gear train with respect to a position of the rotation axis of the ring gear, and a suspension portion configured to support the carrier to be movable upward and downward with respect to a vehicle body.

17 Claims, 12 Drawing Sheets

(51) Int. Cl.
    *B60K 17/04*       (2006.01)
    *F16H 1/00*        (2006.01)
    *F16H 1/28*        (2006.01)
    *B60B 35/12*       (2006.01)

(52) U.S. Cl.
    CPC .......... F16H 1/2818 (2013.01); *B60B 35/125* (2013.01); *F16H 37/12* (2013.01)

(58) Field of Classification Search
    CPC ...... F16H 1/2827; F16H 37/122; F16H 37/12; F16H 37/16; B60B 35/125
    USPC .................................................. 475/149, 150
    See application file for complete search history.

(56) References Cited

U.S. PATENT DOCUMENTS

| | | | | |
|---|---|---|---|---|
| 3,955,435 A * | 5/1976 | Arick | ........................ | F16H 1/32 74/411 |
| 3,990,328 A | 11/1976 | Galbraith | | |
| 5,087,229 A * | 2/1992 | Hewko | ................ | B60K 7/0007 475/149 |
| 5,360,380 A * | 11/1994 | Nottle | ....................... | F16H 3/76 475/182 |
| 6,206,800 B1 | 3/2001 | Kay | | |
| 11,571,966 B1* | 2/2023 | Park | ....................... | F16H 1/2836 |
| 11,639,101 B1* | 5/2023 | Park | ....................... | F16H 1/2863 475/346 |
| 2005/0192151 A1 | 9/2005 | Simon | | |
| 2007/0272458 A1 | 11/2007 | Taniguchi et al. | | |
| 2012/0015771 A1* | 1/2012 | Haeusler | .............. | B60K 17/046 475/183 |
| 2013/0017923 A1 | 1/2013 | Park et al. | | |
| 2014/0011620 A1* | 1/2014 | Munster | ............... | B60K 7/0007 475/149 |
| 2014/0315679 A1 | 10/2014 | Xu | | |
| 2015/0028658 A1* | 1/2015 | Friedmann | ........... | B60K 7/0007 301/6.5 |
| 2015/0096823 A1 | 4/2015 | Raymond | | |
| 2017/0067539 A1 | 3/2017 | Matsumoto et al. | | |
| 2018/0163834 A1 | 6/2018 | Boguski et al. | | |
| 2018/0283514 A1 | 10/2018 | Malligere | | |

\* cited by examiner

UNIVERSAL WHEEL DRIVING SYSTEM

CROSS-REFERENCE TO RELATED APPLICATION

The present application claims priority to Korean Patent Application No. 10-2022-0038690, filed on Mar. 29, 2022, the entire contents of which is incorporated herein for all purposes by this reference.

BACKGROUND OF THE PRESENT DISCLOSURE

Field of the Present Disclosure

The present disclosure relates to a driving system which receives power input from a rotational power source, such as a motor, and outputs changed torque to a wheel contacting with the ground.

Description of Related Art

The driving system of a vehicle transmits power from a rotational power source, such as an engine or a motor, to wheels to drive the vehicle.

An in-wheel motor-type driving system in which a motor is directly provided in a driving wheel has recently been proposed, but the in-wheel motor-type driving system is not being widely used now due to a durability problem of the motor, a ride comfort problem caused by increase in the unsprung mass of the vehicle, etc.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving system which receives power input from a rotational power source, such as a motor, and outputs changed torque, and more particularly, a universal wheel driving system which may decelerate the speed of the input power and increase the torque of the input power to secure excellent uphill driving and accelerated driving performance of a vehicle, may install a power source, such as a motor, separately from a wheel to which severe impact and vibration are applied to improve durability of the power source, may secure excellent ride comfort due to reduction in the upsprung mass of the vehicle, and may achieve continuous power transmission from the power source in response to vertical movement of the wheel without using a constant velocity joint to reduce a space between the power source and the wheel and ultimately to secure excellent space utilization between a left wheel and a right wheel.

In accordance with various aspects of the present disclosure, the above and other objects may be accomplished by the provision of a universal wheel driving system including a sun gear provided to receive power from a power source, a ring gear provided so that a rotation axis thereof is moved relative to a rotation axis of the sun gear in a plane of rotation parallel to a plane of rotation of the sun gear, a wheel is concentrically connected to the ring gear, at least one gear train engaged to the sun gear and the ring gear and configured to allow relative motion between the rotation axes of the sun gear and the ring gear and to form a continuous power transmission state between the sun gear and the ring gear, a carrier constantly supporting a position of a rotation axis of a final pinion configured to form each of the at least one gear train and engaged with the ring gear, with respect to a position of the rotation axis of the ring gear, and a suspension portion configured to support the carrier to be movable upward and downward with respect to a vehicle body.

Each of the at least gear train may be provided through a plurality of links, connection angles between which are changed depending on the relative motion between the rotation axes of the sun gear and the ring gear.

The plurality of links may include a first link, a first end of which is connected to the rotation axis of the sun gear and a second link connected to a second end of the first link, and a joint pinion having the same number of gear teeth as the sun gear may be provided at a connection portion between the first link and the second link.

The final pinion engaged with the ring gear may be provided at the second link, and the final pinion may have the same number of gear teeth as the sun gear.

The final pinion may be configured to transmit power from the sun gear to the ring gear by a series of gears through the joint pinion.

The at least one gear train may include a plurality of gear trains provided in a circumferential direction of the sun gear.

The plurality of links may include a first link, a first end of which is connected to the rotation axis of the sun gear and a second link connected to a second end of the first link, and rotation axes of a series of gears configured to transmit the power from the sun gear to the ring gear may be provided on the first link and the second link.

Among the series of gears configured to form each of the gear trains, gears located at even-numbered positions from the sun gear may have the same number of gear teeth as the sun gear.

A gear located at a second position from the sun gear may be a joint pinion provided concentrically with rotation axes of the first link and the second link, and a gear located at a fourth position from the sun gear may be the final pinion engaged with the ring gear.

A first intermediate pinion configured so that a rotation axis thereof is provided on the first link may be engaged with the sun gear and the joint pinion, and a second intermediate pinion configured so that a rotation axis thereof is provided on the second link may be engaged with the joint pinion and the final pinion.

The at least one gear train may include a plurality of gear trains provided in a circumferential direction of the sun gear, and respective final pinions of the gear trains may be supported by the carrier so that relative positions of the final pinions to one another remain constant and rotation of the final pinions about rotation axes thereof is allowed.

Each of the at least one gear train may be formed by consecutively engaging at least four gears, and rotation axes of the at least four gears may be rotatably supported by the plurality of links consecutively connected.

The at least one gear train may be configured so that relative phases of the sun gear and the ring gear remain constant, in response to relative motion between the rotation axes of the sun gear and the ring gear.

Among the gears, the final pinion engaged with the ring gear may be supported by the carrier so that revolution of the final pinion around the sun gear is restrained and rotation of the final pinion about a rotation axis thereof is allowed.

The power source may be fixed to the vehicle body, and the sun gear may be concentrically connected to a rotation axis of the power source.

Respective final pinions of a plurality of gear trains may be supported by the carrier, the rotation axis of the power source may pass through the carrier and be connected to the sun gear, and the carrier may be provided with a space portion configured to form a space so as not to interfere with the rotation axis of the power source.

The suspension portion may include a shock absorber and a spring provided in parallel between the vehicle body and the carrier.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
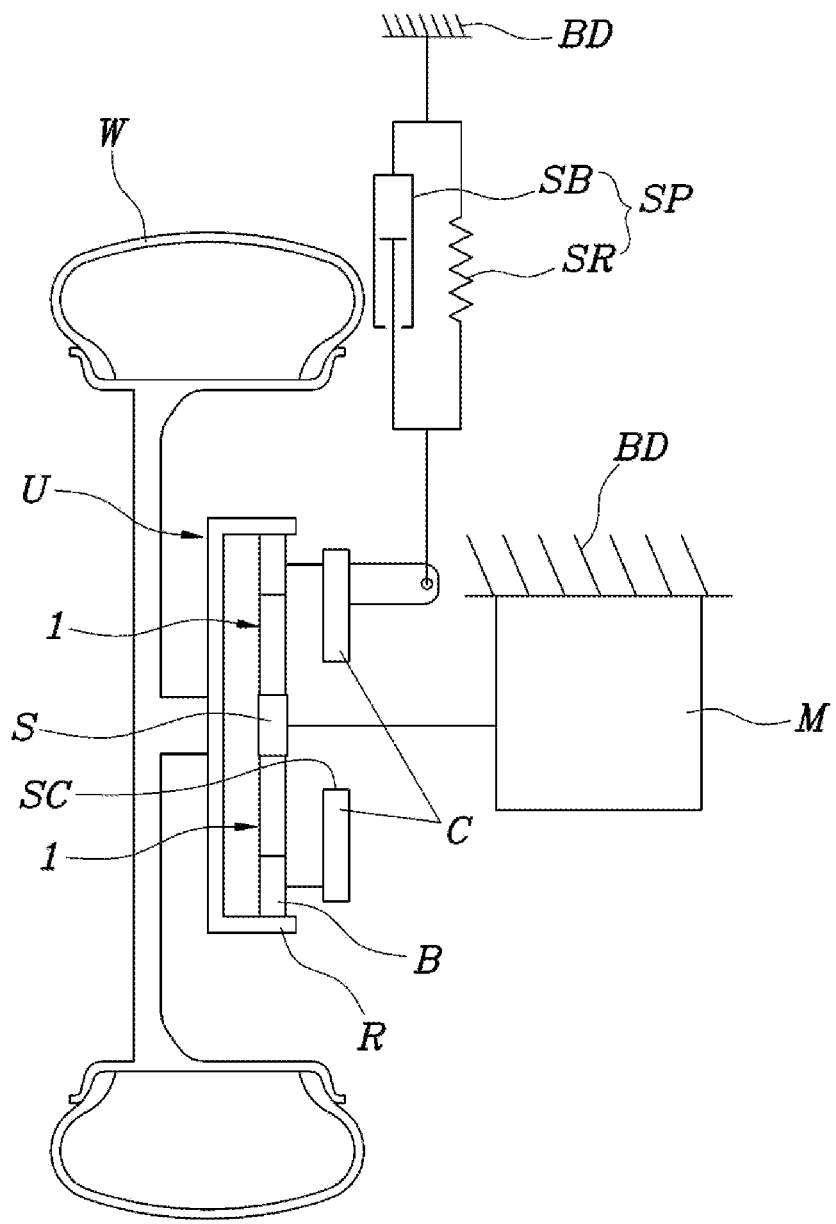
FIG. 1 is a view exemplarily illustrating an exemplary embodiment of a universal wheel driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions in embodiments of the present disclosure set forth in the description which follows will be exemplarily provided to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely include the present disclosure and cover modifications, equivalents or alternatives which come within the scope and technical range of the present disclosure.

In the following description of the embodiments, terms, such as "first" and "second", are used only to describe various elements, and these elements may not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will now be made in detail to the exemplary embodiments of the present disclosure, examples of which are illustrated in the accompanying drawings. Wherever possible, the same reference numbers will be used throughout the drawings to refer to the same or like parts.

Figure 2:
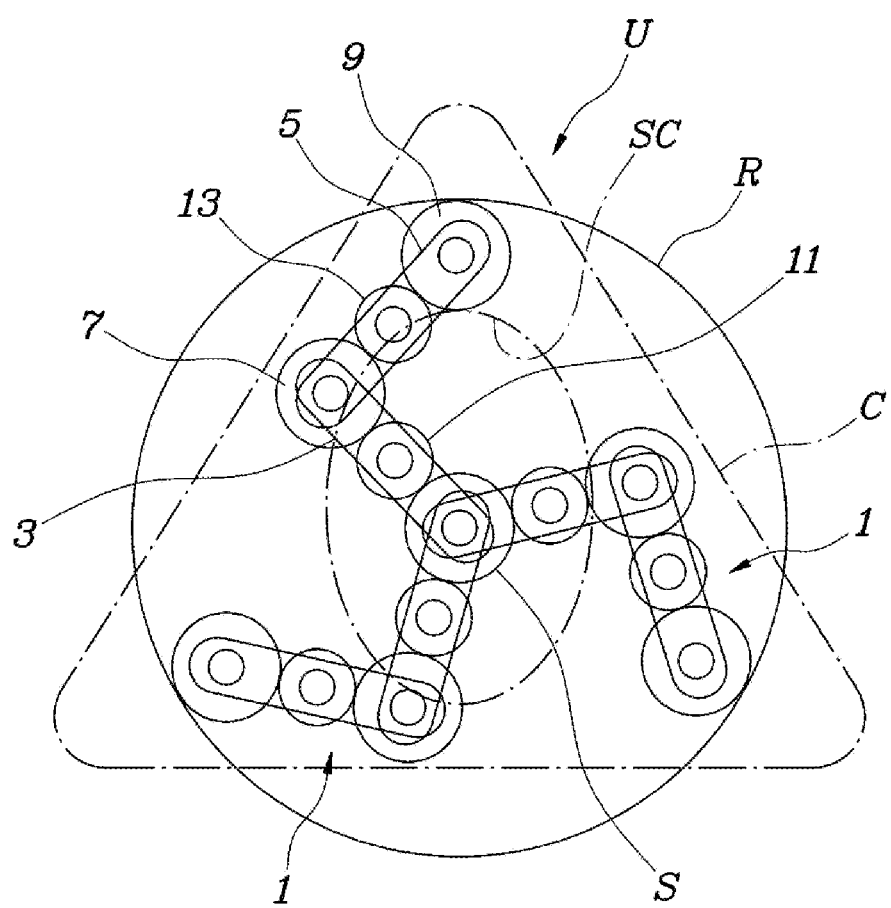
FIG. 2 is a view exemplarily illustrating various exemplary embodiments of a universal driving device used in the system of FIG. 1, viewed from the side of FIG. 1.

Referring to FIG. 1 and FIG. 2, a universal wheel driving system according to an exemplary embodiment of the present disclosure includes a sun gear S provided to receive power from a power source, a ring gear R provided so that the rotation axis thereof is moved relative to the rotation axis of the sun gear S in a plane of rotation parallel to the plane of rotation of the sun gear S and a wheel W is concentrically connected to the ring gear R, gear trains 1 configured to allow relative motion between the rotation axes of the sun gear S and the ring gear R and to form a continuous power transmission state between the sun gear S and the ring gear R, a carrier C configured to constantly support the position of the rotation axis of a final pinion 9 configured to form each of the gear trains 1 and engaged with the ring gear R, with respect to the position of the rotation axis of the ring gear R, and a suspension portion SP configured to support the carrier C to be movable upward and downward with respect to a vehicle body BD.

That is, assuming that the sun gear S, the ring gear R, the gear trains 1 and the carrier C are collectively called a universal driving device U, the system according to the represent disclosure is configured so that the wheel W may be connected to the ring gear R of the universal driving device U and come into contact with the ground, the carrier C may be coupled to the vehicle body BD through the suspension portion SP to be movable upward and downward, and the power from the power source fixed to the vehicle body BD is continuously input to the sun gear S.

Here, as the carrier C constantly supports the positions of the rotation axes of the final pinions 9, engaged with the ring gear R, with respect to the position of the rotation axis of the ring gear R, the carrier C restrains translational motion of the ring gear R relative to the sun gear S, and is thus raised or lowered, i.e., moved up or down, when the wheel W and the ring gear R are raised and lowered relative to the sun gear S.

FIG. 2 illustrates a first exemplary embodiment of the universal driving device U, FIG. 6, FIG. 7, FIG. 8, FIG. 9 and FIG. 10 illustrate second to sixth embodiments of the universal driving device U, and the exemplary embodiments of the universal driving device U may be configured so that the wheel W is connected to each ring gear R, the carrier C is supported by the vehicle body BD by the suspension portion SP, and the sun gear S is connected to the power source, being configured for forming the universal wheel driving system according to an exemplary embodiment of the present disclosure.

In the exemplary embodiments of the universal driving device U, in common, the sun gear S and the ring gear R are provided so that the rotation axes thereof maintain parallel to each other and relative displacements thereof are allowed, and at least one the gear train 1 is provided to continuously maintain the power transmission state between the sun gear S and the ring gear R in spite of the relative displacements of the sun gear S and the ring gear R.

The gear train 1 is provided through a plurality of links, connection angles between which are changed depending on the relative motion between the rotation axes of the sun gear S and the ring gear R.

The plurality of links may include a first link 3 connected to the rotation axis of the sun gear S and a second link 5 connected to the first link 3, rotation axes of a series of gears are provided on the first link 3 and the second link 5 to transmit power from the sun gear S to the ring gear R, and a joint pinion 7 having the same number of gear teeth as the sun gear S is provided at a connection portion between the first link 3 and the second link 5.

The final pinion 9 engaged with the ring gear R is provided at the second link 5, and the final pinion 9 has the same number of gear teeth as the sun gear S.

Therefore, the final pinion 9 may transmit power from the sun gear S to the ring gear R by the series of gears through the joint pinion 7, and the sun gear S, the joint pinion 7 and the final pinion 9 have the same number of gear teeth.

As described above, among the series of gears forming the gear train 1, gears located at even-numbered positions from the sun gear S, i.e., the joint pinion 7 and the final pinion 9, should have the same number of gear teeth as the sun gear S, so that the ring gear R may be moved relative to the sun gear S without changing relative phases of the sun gear S and the ring gear R, and a continuous and stable power transmission state between the sun gear S and the ring gear R may be maintained.

A first intermediate pinion 11, the rotation axis of which is provided on the first link 3, is engaged with the sun gear S and the joint pinion 7, and a second intermediate pinion 13, the rotation axis of which is provided on the second link 5, is engaged with the joint pinion 7 and the final pinion 9.

Therefore, power from the sun gear S may sequentially pass the first intermediate pinion 11, the joint pinion 7, the second intermediate pinion 13 and the final pinion 9, and may be transmitted to the ring gear R.

A plurality of gear trains 1 may be provided as in the exemplary embodiments of the universal driving device U shown in FIGS. 2 to 9, and when the plurality of gear trains 1 is provided as described above, the respective final pinions 9 of the plurality of gear trains 1 are rotatably supported by the carrier C so that the relative positions of the final pinions 9 to one another may remain constant and the final pinions 9 may be allowed only to rotate about rotation axes thereof.

In case of the various exemplary embodiments shown in FIG. 2, FIG. 3, FIG. 4 and FIG. 5, three final pinions 9 are provided in a triangular shape on the carrier C to be engaged with the internal surface of the ring gear R, and the ring gear R is stably supported by the final pinions 9 so that the central axis of the ring gear R is stably maintained without shaking with respect to the carrier C.

Consequently, the positions of the rotation axes of the final pinions 9 are constantly supported with respect to the position of the rotation axis of the ring gear R.

Therefore, when the wheel W connected to the ring gear R is raised or lowered, the final pinions 9 and the carrier C are also raised or lowered, and raising and lowering of the carrier C may be buffered and damped by the suspension portion SP.

Figure 6:
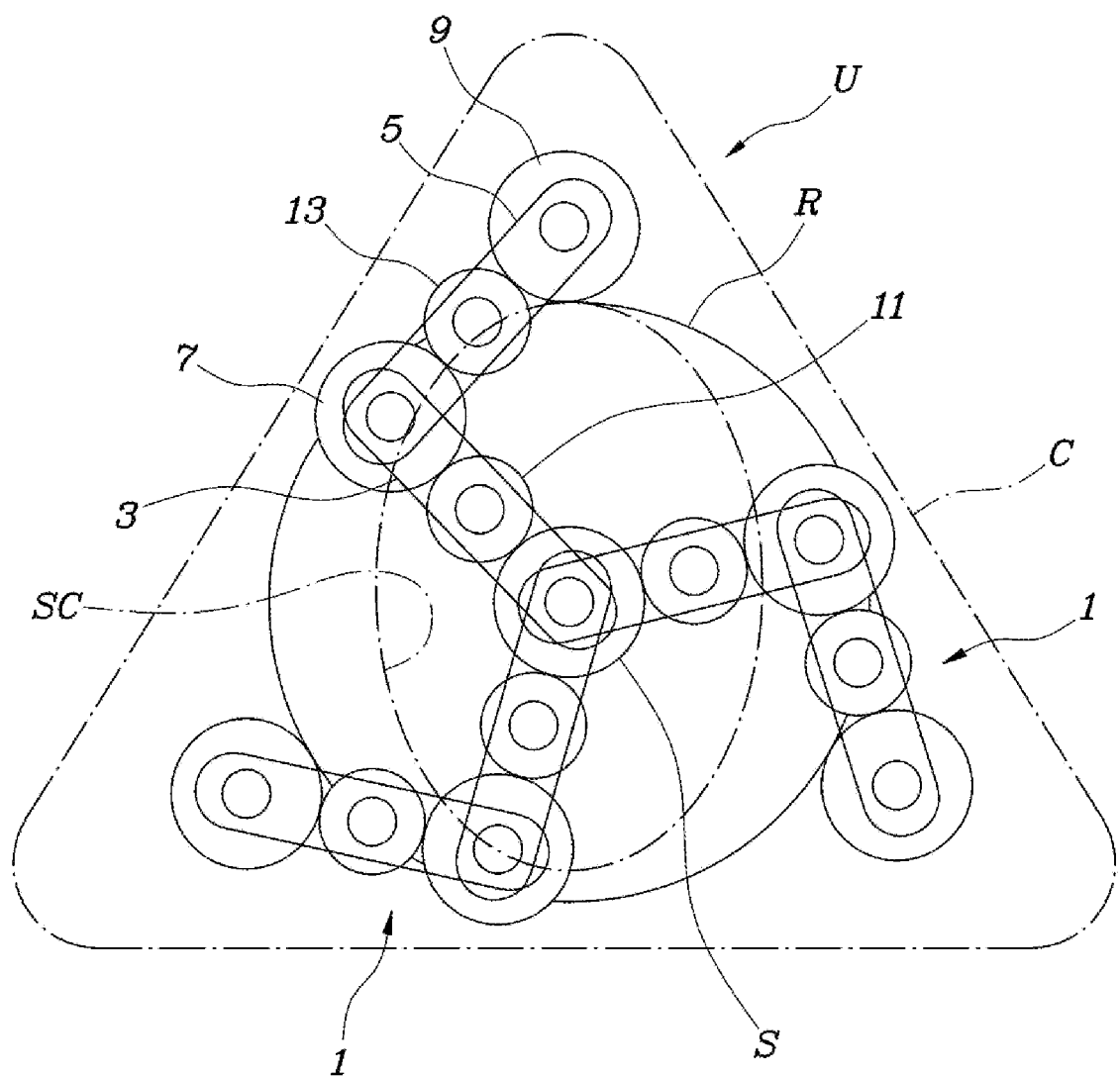
FIG. 6 is a view exemplarily illustrating various exemplary embodiments of the universal driving device used in the system of FIG. 1.

In case of the various exemplary embodiments shown in FIG. 6, three final pinions 3 are rotatably provided on the carrier C, are engaged with the external surface of the ring gear R to restrain the ring gear R, and thus, the positions of the rotation axes of the final pinions 9 are constantly supported with respect to the position of the rotation axis of the ring gear R.

Figure 7:
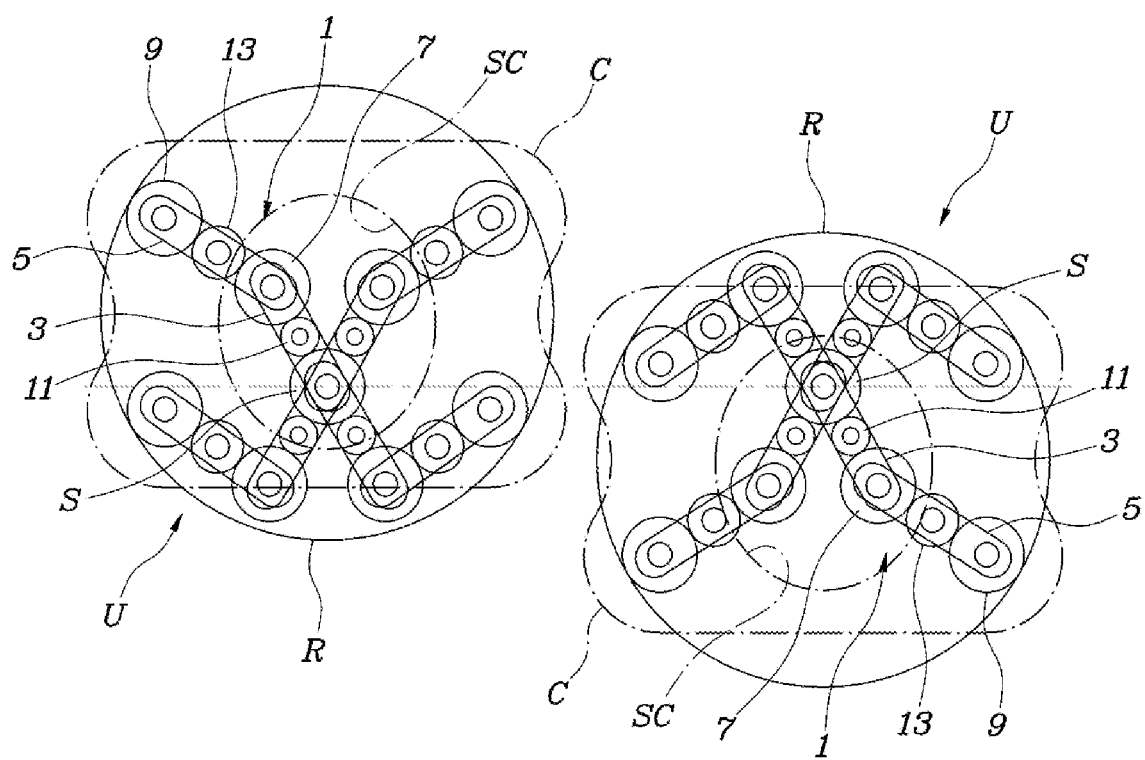
FIG. 7 is a view exemplarily illustrating raising and lowering of a ring gear with respect to a sun gear of various exemplary embodiments of the universal driving device used in the system of FIG. 1.
Figure 8:
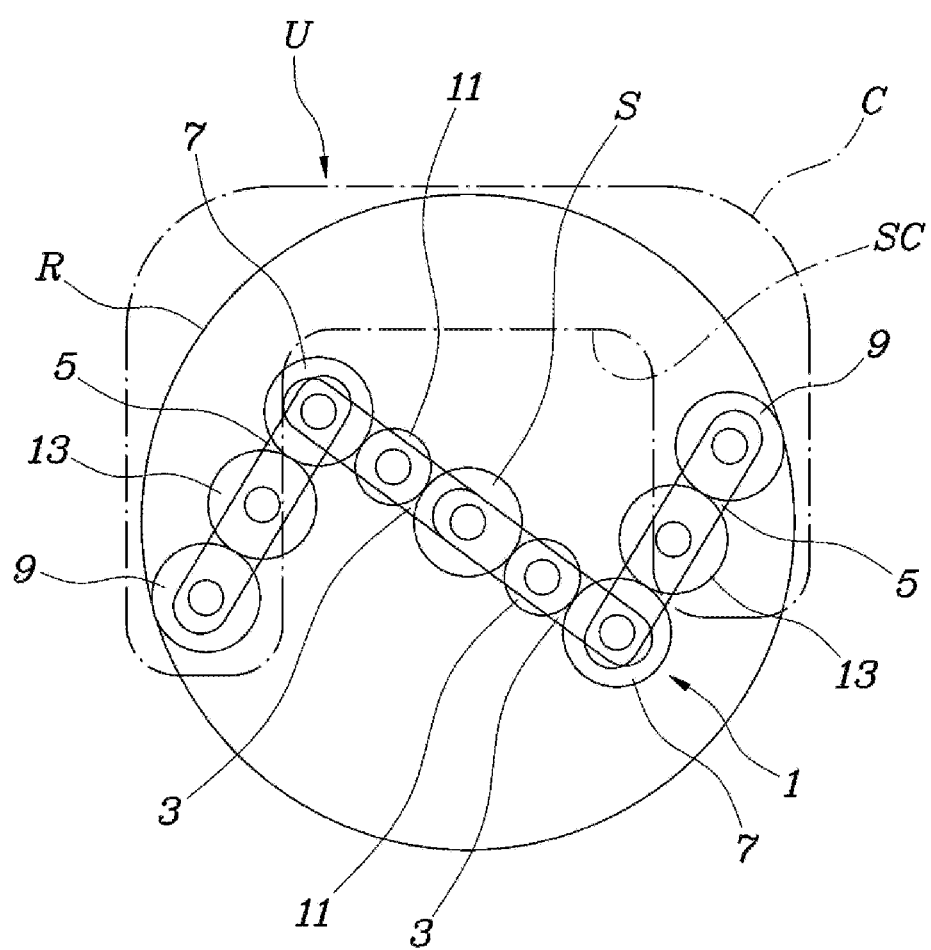
FIG. 8 is a view exemplarily illustrating various exemplary embodiments of the universal driving device used in the system of FIG. 1.
Figure 9:
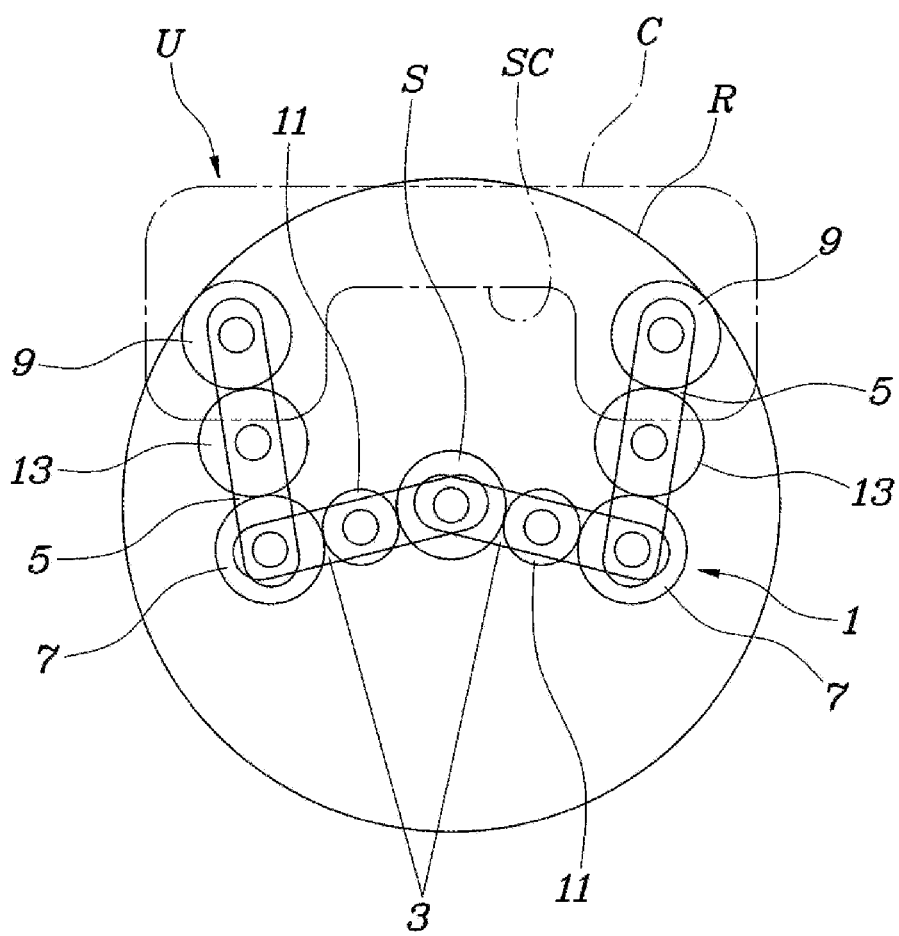
FIG. 9 is a view exemplarily illustrating various exemplary embodiments of the universal driving device used in the system of FIG. 1.

In case of the various exemplary embodiments shown in FIG. 7, four gear trains 1 are provided, four final pinions 9 are provided, and also in the same manner, the positions of the rotation axes of the final pinions 9 supported by the carrier C remain constant with respect to the position of the rotation axis of the ring gear R In case of the various exemplary embodiments shown in FIG. 8 and FIG. 9, two gear trains 1 are provided, two final pinions 9 are provided, and although the ring gear R may be supported with respect to the carrier C by the two final pinions 9, to more securely support the ring gear R, a separate balance gear engaged with the ring gear R and rotatably fixed to the carrier C may be provided.

Figure 10:
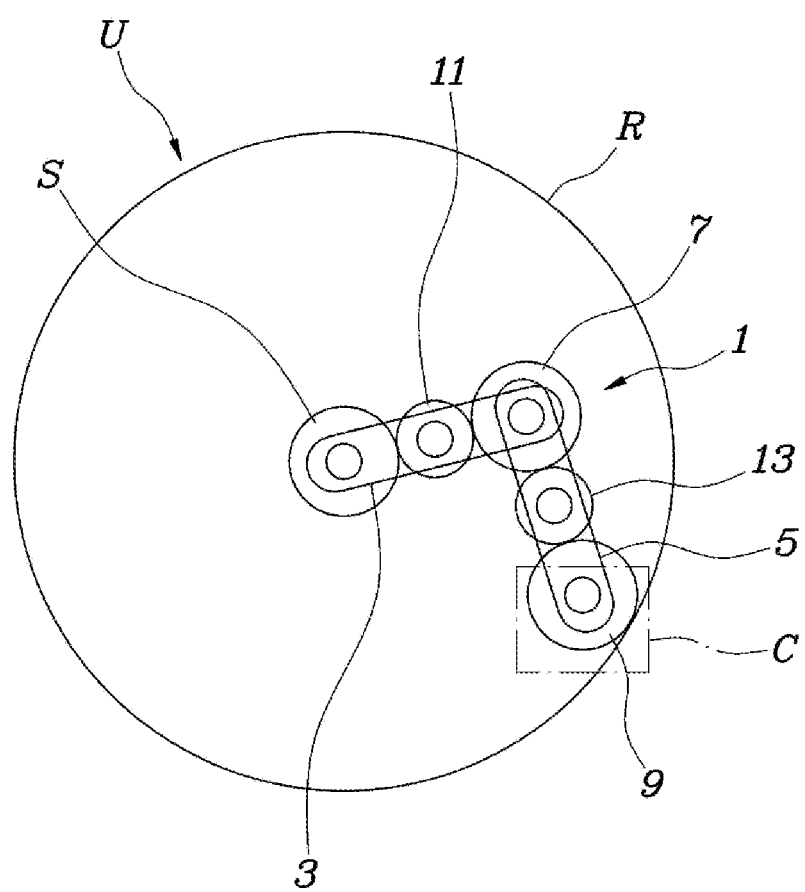
FIG. 10 is a view exemplarily illustrating various exemplary embodiments of the universal driving device used in the system of FIG. 1.
Figure 11:
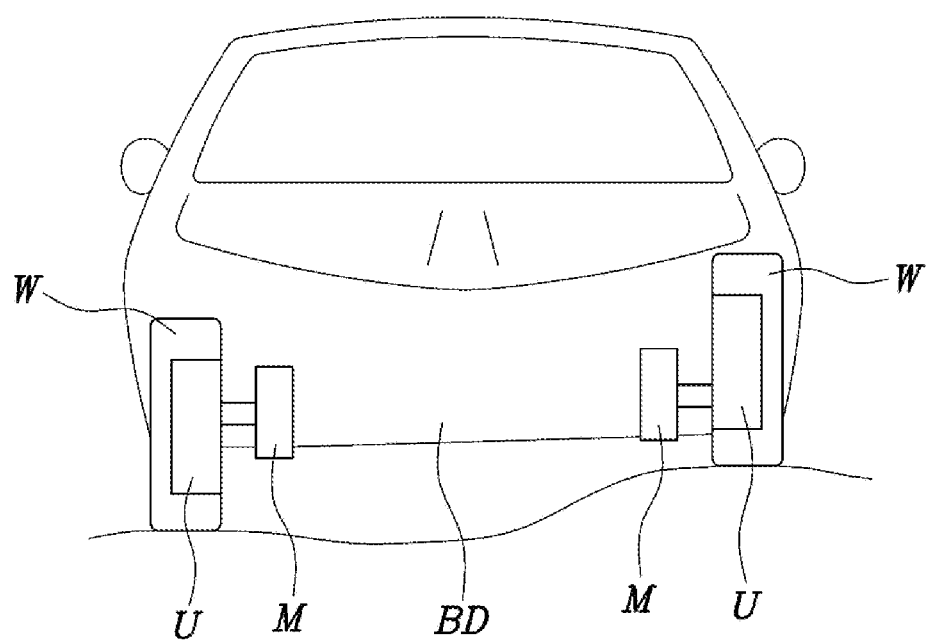
FIG. 11 is a view exemplarily illustrating application of the universal wheel driving system according to an exemplary embodiment of the present disclosure to a vehicle.

In case of the various exemplary embodiments shown in FIG. 10, one gear train 1 is provided, one final pinion 9 is provided, and it is difficult for one final pinion 9 to substantially support the ring gear R with respect to the carrier C. In the instant case, a separate balance gear engaged with the ring gear R may be added to the carrier C, or a roller configured to guide the external circumferential surface of the ring gear R may be added to the carrier C, being configured for stably supporting the ring gear R with respect to the carrier C.

Figure 3:
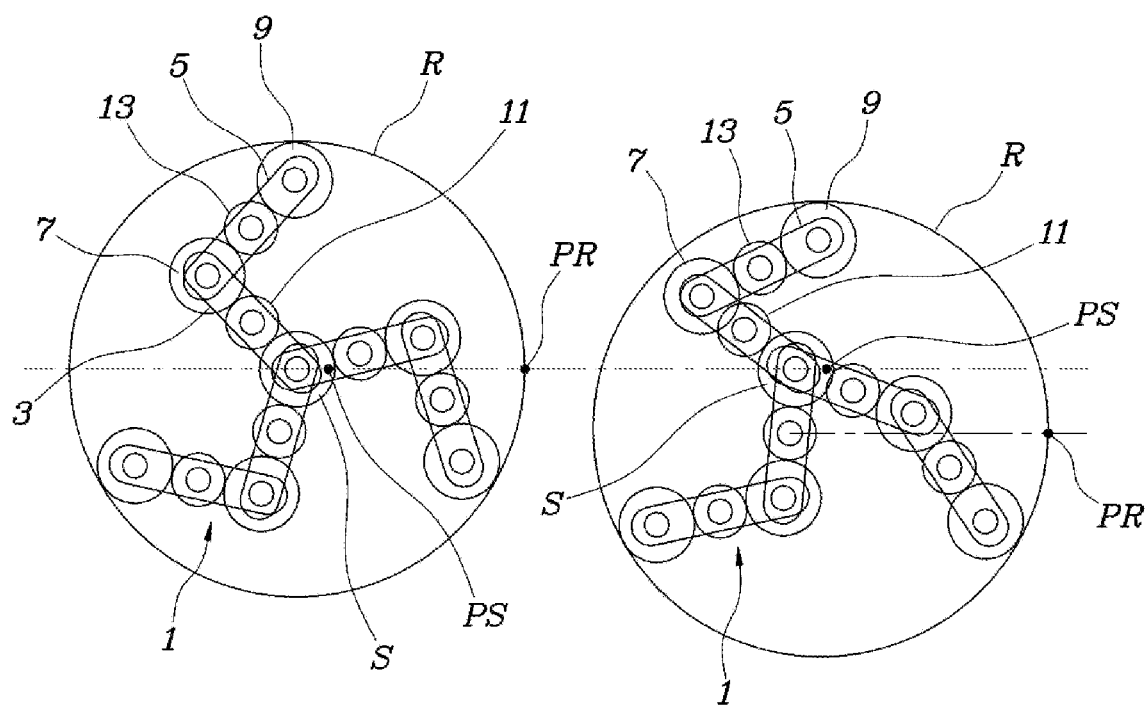
FIG. 3 is a view exemplarily illustrating comparison between the original state of the various exemplary embodiments of the universal driving device shown in FIG. 2 and the state of the various exemplary embodiments of the universal driving device in which a ring gear is lowered.
Figure 4:
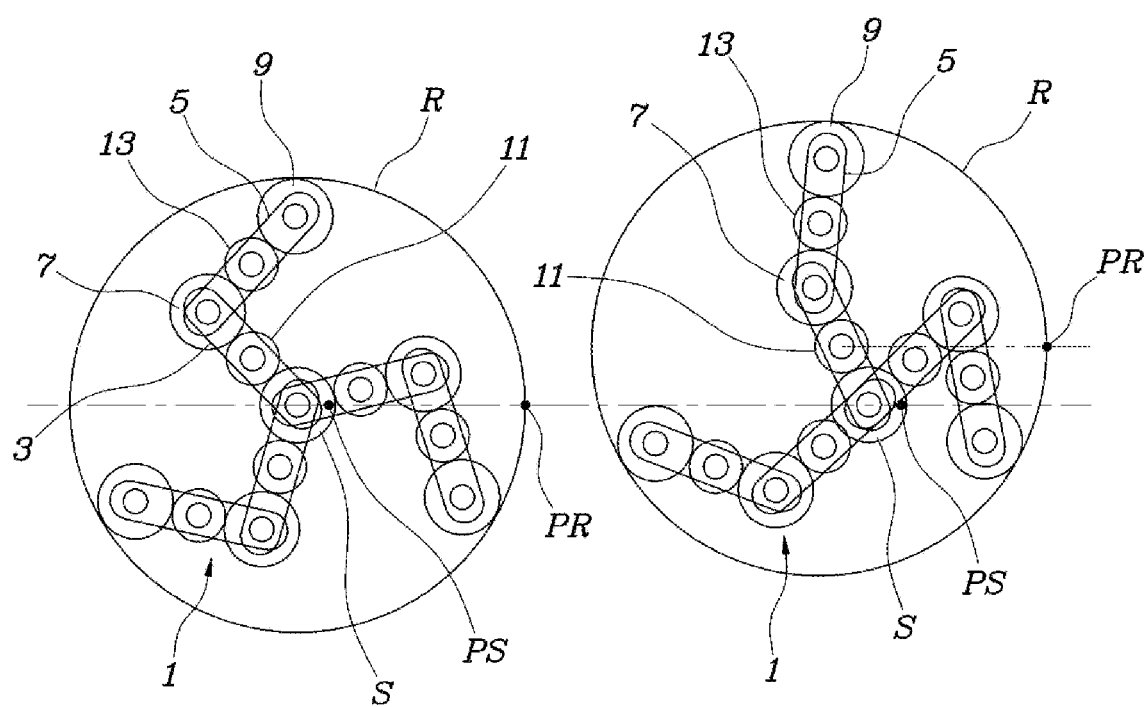
FIG. 4 is a view exemplarily illustrating comparison between the original state of the various exemplary embodiments of the universal driving device shown in FIG. 2 and the state of the various exemplary embodiments of the universal driving device in which a ring gear is raised.
Figure 5:
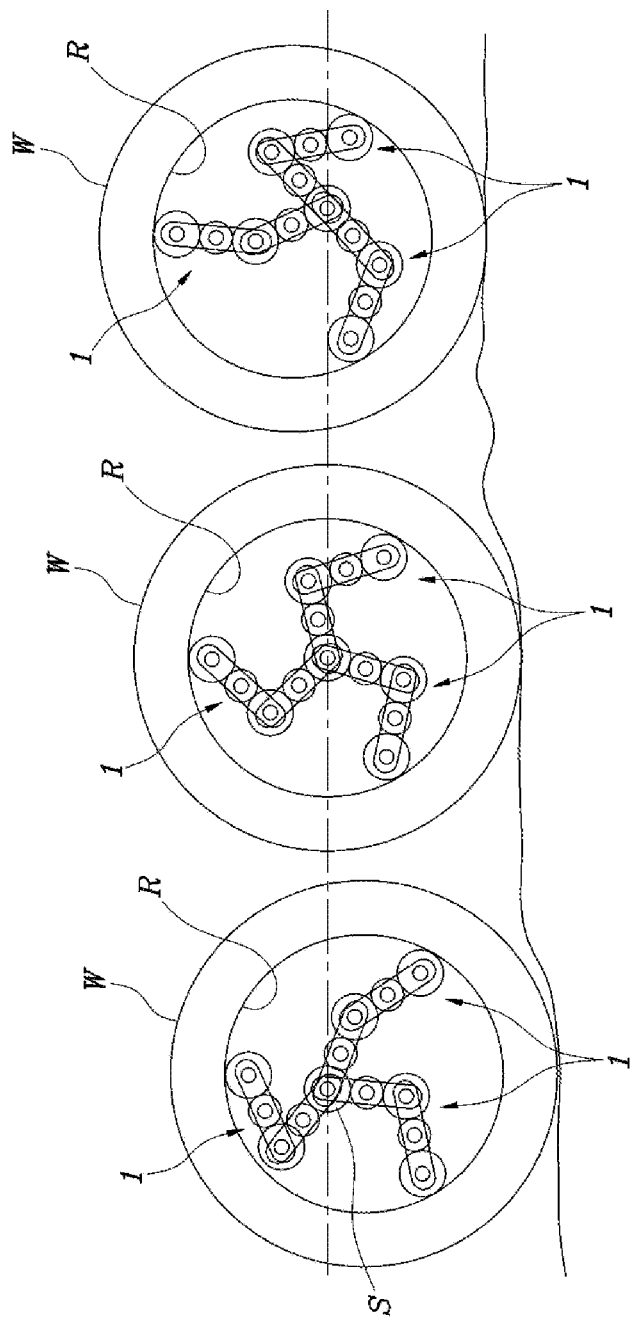
FIG. 5 is a view exemplarily illustrating raising and lowering of a wheel of a vehicle, to which the various exemplary embodiments of the universal driving device shown in FIG. 2 is applied, with respect to a sun gear depending on irregularities of the ground.

Referring to FIG. 3 and FIG. 4, in raising or lowering of the ring gear R relative to the sun gear S, the angle between the first link 3 and the second link 5 in each of the gear trains 1 is changed, and the first intermediate pinion 11 continuously maintains engagement with the sun gear S and the final pinion 9 continuously maintains engagement with the ring gear R, so that continuous power transmission between the sun gear S and the ring gear R may be achieved.

The gear trains 1 are configured so that the relative phases of the sun gear S and the ring gear R remain constant in response to the relative motion between the rotation axes of the sun gear S and the ring gear R.

Here, remaining of the relative phases of the sun gear S and the ring gear R in response to the relative motion between the rotation axes of the sun gear S and the ring gear S constant may indicate that phases of points PS and PR marked at 0 degree positions of the sun gear S and the ring gear R in a direction of rotation maintain the 0 degree positions thereof even when the ring gear R is raised or lowered relative to the sun gear S, as shown in FIG. 3 and FIG. 4.

That is, when the rotation axes of the sun gear S and the ring gear R translate relative to each other in the same plane, the sun gear S and the ring gear R are not rotated relative to each other by the translational motion of the rotation axes of the gun gear S and the ring gear R.

This means that additional rotation motion of the sun gear S does not occur, although the wheel W of the vehicle is moved up and down due to vertical irregularities of a road and thus the ring gear R connected to the wheel W is moved up and down, and means that the torque of the sun gear S may be easily and stably controlled through control of the torque of the motor connected to the sun gear S.

To allow the relative phases of the sun gear S and the ring gear R to remain constant when the ring gear R is raised or lowered relative to the sun gear S, among the series of gears forming each of the gear trains 1, gears located at even-numbered positions from the sun gear S, i.e., the joint pinion 7 and the final pinion 9, should have the same number of gear teeth as the sun gear S.

These characteristics of the universal wheel driving system according to an exemplary embodiment of the present disclosure may allow the relative phases of the sun gear S and the ring gear R to remain constant, when the vehicle is driven using power of a motor M and the wheel W and the ring gear R are raised or lowered relative to the sun gear S under the condition that the sun gear S is connected to a power source fixed to the vehicle body BD, i.e., the motor M, the wheel W is connected to the ring gear R, and the carrier C is supported by the vehicle body BD to be movable upward and downward, as illustrated in FIGS. 1 to 11, and may thus continuously and stably transmit power from the motor M to the wheel W sequentially via the sun gear S, the gear trains 1 and the ring gear R, while preventing the vehicle from surging or pitching.

The sun gear S is concentrically connected to the rotation axis of the motor M provided as the power source, and such a state remains continuously while driving of the vehicle.

Figure 12:
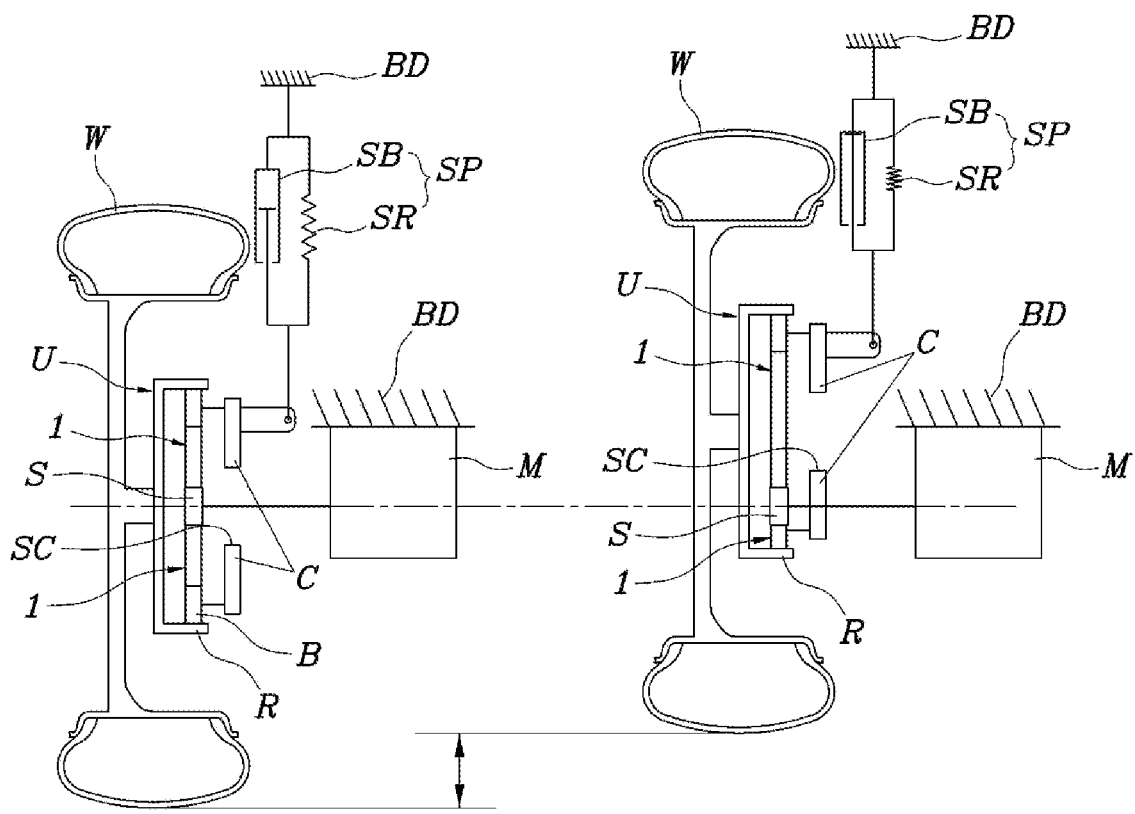
FIG. 12 is a view exemplarily illustrating that the sun gear and a motor are not raised or lowered with respect to a vehicle body and maintain a concentric state even when the ring gear and the wheel are raised or lowered with respect to the vehicle body.

That is, even when the wheel W and the ring gear R are raised or lowered along irregularities of a road, as illustrated in FIG. 12, the rotation axes of the sun gear S and the motor M are not raised or lowered with respect to the vehicle body BD, and continuously maintain the concentric state.

The rotation axis of the power source passes through the carrier C and is connected to the sun gear S, and the carrier C is provided with a space portion SC configured to form a space so as not to interfere with the rotation axis of the power source.

That is, the power source and the sun gear S are not raised or lowered with respect to the vehicle body BD and remain constant even when the ring gear R and the wheel W are raised or lowered with respect to the vehicle body BD, and thus, to prevent the rotation axis of the power source passing through the carrier C from interfering with the carrier C, the space portion SC is provided in the carrier C.

The space portion SC may be provided to form a hole in the carrier C, as shown in corresponding figures, or may be provided to form a recess.

The suspension portion SP may include a shock absorber SB and a spring SR which are provided in parallel between the vehicle body BD and the carrier C.

Substantially, the suspension portion SP may include a strut into which the shock absorber SB and the spring SR are integrated.

Therefore, the universal driving device is provided to support the vehicle from a road through the suspension portion SP, and impact or vibration from the road, input from the wheel W to the carrier C through the ring gear R, is buffered and damped by the suspension portion SP, and thus, the amount of the impact or vibration transmitted to the vehicle body BD is greatly reduced.

The universal wheel driving system according to an exemplary embodiment of the present disclosure may be configured so that the speed of the motor M input to the sun gear S may be decelerated and the torque of the motor M be increased and transmitted to the ring gear R, being configured for securing excellent uphill driving and accelerated driving performance of the vehicle.

Furthermore, the universal wheel driving system according to an exemplary embodiment of the present disclosure may install the motor M outside the wheel W to which severe impact and vibration are applied, rather than inside the wheel W, being configured for improving durability of the motor M and securing excellent ride comfort due to reduction in the upsprung mass of the vehicle.

Moreover, the universal wheel driving system according to an exemplary embodiment of the present disclosure may achieve constant power transmission while allowing the ring gear R, to which the wheel W is connected, to be raised or lowered relative to the sun gear S connected to the power source, and may thus achieve continuous power transmission from the power source in response to vertical movement of the wheel without using the conventional constant velocity joint, being configured for reducing a space between the power source and the wheel W, and ultimately securing excellent space utilization between a left wheel and a right wheel.

As is apparent from the above description, a universal wheel driving system according to an exemplary embodiment of the present disclosure may properly decelerate the speed of the input power and increase the torque of the input power from a power source, such as a motor, to secure excellent uphill driving and accelerated driving performance of a vehicle, may install the power source, such as the motor, separately from a wheel to which severe impact and vibration are applied to improve durability of the power source, may secure excellent ride comfort due to reduction in the upsprung mass of the vehicle, and may achieve continuous power transmission from the power source in response to vertical movement of the wheel without using a constant velocity joint to reduce a space between the power source and the wheel and ultimately to secure excellent space utilization between a left wheel and a right wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A universal wheel driving system comprising:
   a sun gear provided to receive power from a power source;
   a ring gear, wherein a rotation axis of the ring gear is movable relative to a rotation axis of the sun gear, and a wheel is concentrically connected to the ring gear;
   at least one gear train engaged to the sun gear and the ring gear and configured to allow relative motion between the rotation axes of the sun gear and the ring gear and to form a continuous power transmission state between the sun gear and the ring gear;
   a carrier constantly supporting a position of a rotation axis of a final pinion, with respect to a position of the rotation axis of the ring gear, wherein the final pinion of the at least one gear train is engaged with the ring gear; and
   a suspension portion configured to support the carrier to be movable upward and downward with respect to a vehicle body.

2. The universal wheel driving system of claim 1, wherein each of the at least one gear train is provided through a plurality of links, connection angles between which are changed depending on the relative motion between the rotation axes of the sun gear and the ring gear.

3. The universal wheel driving system of claim 2,
   wherein the plurality of links includes a first link, a first end of which is connected to the rotation axis of the sun gear and a second link connected to a second end of the first link, and
   wherein a joint pinion having a same number of gear teeth as the sun gear is provided at a connection portion between the second end of the first link and a first end of the second link.

4. The universal wheel driving system of claim 3,
   wherein the final pinion engaged with the ring gear is provided at a second end of the second link, and
   wherein the final pinion has a same number of gear teeth as the sun gear.

5. The universal wheel driving system of claim 4, wherein the final pinion is configured to transmit the power from the sun gear to the ring gear by a series of gears through the joint pinion.

6. The universal wheel driving system of claim 4, wherein the at least one gear train includes a plurality of gear trains provided in a circumferential direction of the sun gear.

7. The universal wheel driving system of claim 2,
   wherein the plurality of links includes a first link, a first end of which is connected to the rotation axis of the sun gear and a second link connected to a second end of the first link, and
   wherein rotation axes of a series of gears in the at least one gear train configured to transmit the power from the sun gear to the ring gear are provided on the first link and the second link.

8. The universal wheel driving system of claim 7, wherein, among the series of gears configured to form each of the at least one gear train, gears located at even-numbered positions from the sun gear have a same number of gear teeth to the sun gear.

9. The universal wheel driving system of claim 8,
   wherein a gear located at a second position from the sun gear among the series of gears is a joint pinion provided concentrically with rotation axes of the first link and the second link, and
   wherein a gear located at a fourth position from the sun gear among the series of gears is the final pinion engaged with the ring gear.

10. The universal wheel driving system of claim 9,
    wherein the series of gears further includes a first intermediate pinion and a second intermediate pinion,
    wherein a rotation axis of the first intermediate pinion is provided on the first link and is engaged with the sun gear and the joint pinion, and wherein a rotation axis of the second intermediate pinion is provided on the second link and is engaged with the joint pinion and the final pinion.

11. The universal wheel driving system of claim 10, wherein the at least one gear train includes a plurality of gear trains provided in a circumferential direction of the sun gear, and wherein respective final pinions of the gear trains are supported by the carrier so that relative positions of the final pinions to one another remain constant and rotation of the final pinions about rotation axes thereof is allowed.

12. The universal wheel driving system of claim 2, wherein each of the at least one gear train is formed by consecutively engaging at least four gears, and wherein rotation axes of the at least four gears are rotatably supported by the plurality of links consecutively connected.

13. The universal wheel driving system of claim 12, wherein the at least one gear train is configured so that relative phases of the sun gear and the ring gear remain constant, in response to the relative motion between the rotation axes of the sun gear and the ring gear.

14. The universal wheel driving system of claim 13, wherein, among the at least four gears, the final pinion engaged with the ring gear is supported by the carrier so that revolution of the final pinion around the sun gear is restrained and rotation of the final pinion about the rotation axis of the final pinion is allowed.

15. The universal wheel driving system of claim 1, wherein the power source is fixed to the vehicle body, and wherein the sun gear is concentrically connected to a rotation axis of the power source.

16. The universal wheel driving system of claim 15, wherein the at least one gear train includes a plurality of gear trains provided in a circumferential direction of the sun gear, wherein respective final pinions of the plurality of gear trains are supported by the carrier, wherein the rotation axis of the power source passes through the carrier and is connected to the sun gear, and wherein the carrier is provided with a space portion configured to form a space so as not to interfere with the rotation axis of the power source.

17. The universal wheel driving system of claim 1, wherein the suspension portion includes a shock absorber and a spring provided in parallel between the vehicle body and the carrier.

* * * * *